Patented Sept. 4, 1951

2,566,341

UNITED STATES PATENT OFFICE 2,566,341

STEROID HYDROXYTHIOESTERS

Robert H. Levin, A. Vern McIntosh, Jr., and George B. Spero, Kalamazoo, Mich., assignors to The Upjohn Company, Kalamazoo, Mich., a corporation of Michigan No Drawing. Application September 15, 1947, Serial No. 774,174

12 Claims. (Cl. 260—397.1)

The present invention relates to a novel process for the preparation of pregnane thioesters having an unsubstituted C-3 hydroxyl group, a 5 double bond, and a C-20 side-chain of the formula

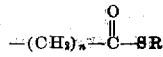

wherein $n$ is a zero, one, or two and R is a thioalcohol residue.

It is an object of the present invention to provide a novel process for the conversion of a 3-formoxy-pregnane having a 5 double bond and C-20 side-chain of the formula $—(CH_2)_n—COX$, wherein X is hydroxyl or halogen and $n$ is zero, one, or two, to a 3-hydroxy-pregnane thioester having the 5 double bond, and a C-20 side-chain of the formula

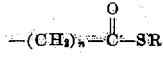

wherein $n$ has the value previously assigned, and R is a thioalcohol residue, in a single operation. A further object of the invention is the provision of a such process wherein acyloxy, including formoxy, and other substituents such as alkoxy and halogen, at positions in the unsaturated pregnane nucleus other than the 3-position, are not affected while the thioester is formed and the 3-formoxy group is converted to hydroxyl. An especial object of the invention is the provision of a such process whereby the thioester is produced with concomitant conversion of the 3-formoxy group to hydroxy, while an additional acyloxy, including formoxy, group at the 11- or 12-position in the unsaturated pregnane nucleus, is not converted to hydroxy. Other objects of the invention will become apparent hereinafter.

It has now been found that, when a pregnane derivative having a 3-formoxy group, a 5 double bond, and a C-20 side-chain of the formula $—(CH_2)_n—COX$, wherein X is hydroxyl or halogen and $n$ is zero, one, or two, is reacted with a mercaptan in the presence of an acid-binding agent, such as pyridine, substituted pyridines, dimethylaniline, quinoline, sodium bicarbonate, magnesium or calcium oxide, not only is thioesterification accomplished, but the 3-formoxy group is simultaneously converted to hydroxyl. This lability appears, at least partially, to be a result of the position of the formoxy group with relation to the 5-6 double bond. Contrastingly, when an acetoxy group is present at C-3, thioesterification is the only reaction to occur.

The importance of this observation resides in several valuable applications. First, the conversion of a 3-formoxy acid or acid halide to the 3-hydroxy thioester may be conducted in a single step, instead of two separate steps. Second, where another acyloxy substituent is present in the pregnane nucleus, e. g., at the C-11 or C-12 position, the present invention accomplishes selective preparation of a thioester having 3-hydroxy and 11- or 12-acyloxy substituents, thereby allowing variations to be effected between the C-3 and C-11 or 12-acyloxy groups. Previously, it has been necessary to convert the 3-acyloxy group to hydroxyl by hydrolysis, which also resulted in hydrolysis of other acyloxy groups in the pregnane nucleus, and subsequent acylation converted both hydroxy groups to the same acyloxy radical. The importance of the present invention should therefore be obvious, as it allows novel modifications of steroid nuclei for the preparation of hormone intermediates.

The starting acids and acid halides are known compounds. These may be, for example, any of the cholenic, nor-cholenic, or bisnor-cholenic acids or acid halides having a 3-formoxy group. Hydroxy, alkoxy, halogen, and other acyloxy, including formoxy, groups may be present in the unsaturated pregnane nucleus at positions other than the C-3 position. Likewise, other unsaturated compounds, such as 3-formoxy-(delta 5,7)-choladienic acids and acid halides, may be employed. Prerequisites for the starting material are that it contain a 3-formoxy group, a 5-6 double bond, and an acid or acid halide grouping in the side-chain attached to carbon atom 20 of the pregnane nucleus. A convenient method of preparing 3-formoxy compounds is by heating the 3-hydroxy acid with concentrated formic acid for a period of about two hours, and then reacting the product with thionyl or oxalyl chloride to form the acid chloride, if desired. Preferred starting materials are the 3-formoxy-11- or 12-acyloxy-pregnene acids and acid chlorides having the designated side-chain at C-20, and, with the acid halides, the chloride is preferred. Likewise, among acid-binding agents, it is preferred to use pyridine. Representative compounds which may be treated are 3-formoxy-11-acetoxy-(delta 5)-cholenic acid, 3-formoxy-11-acetoxy-(delta 5)-nor-cholenic acid, 3-formoxy-12-benzoyloxy-(delta 5) - bisnor - cholenic acid chloride, 3-formoxy-11-hydroxy-(delta 5)-bisnor-cholenic acid chloride, 3-formoxy-12-acetoxy-(delta 5)-bisnor-cholenic acid chloride, 3-formoxy-11-propionoxy-(delta 5) - nor-cholenic acid chloride, and 3,11-diformoxy-(delta 5)- cholenic acid chloride, all of which give, upon treatment by the method of the present invention, a thioester of corresponding side-chain length, having the 3-formoxy group transformed into a hydroxyl group. Stereoconfiguration of starting materials is immaterial.

The procedure of the present invention essentially comprises admixture of the selected 3-formoxy acid or acid halide, preferably the latter, usually in an organic solvent, such as anhydrous benzene, toluene, xylene, ether, or petroleum hydrocarbons, with the desired organic acid-binding agent and a selected mercaptan of the formula R–SH, wherein R is an organic residue of a thioalcohol. R may be, for example, alkyl, e. g., methyl, ethyl, propyl, isopropyl, butyl, isobutyl, amyl, n-octyl, dodecyl, or the like; cycloalkyl, e. g., cyclopentyl, cyclohexyl; cycloalkyl-alkyl, e. g., cyclohexylmethyl; aryl, e. g., phenyl, naphthyl; or aralykyl, e. g., benzyl or phenethyl. Unsaturated aliphatics and cycloaliphatics may also be employed, provided the required starting material is available. Substituted hydrocarbon radicals, e. g., chlorobenzyl, nitrophenyl, bromoethyl, aminopropyl, are also satisfactory. The choice of R in the mercaptan is arbitrary, availability of the mercaptan being the only limiting factor.

Equimolar proportions of reactants are satisfactory, but an excess of mercaptan may sometimes be used to advantage. The reaction mixture is allowed to stand at about room temperature, 15–30 hours usually being sufficient time for reaction. Gentle heating sometimes increases the reaction rate, but is not usually necessary. The reaction product may be worked up with water and organic solvent, e. g., ether, acqueous portions extracted, and combined organic layer washed with water, dilute alkali, dilute acid, and again with water. After drying the neutral fraction and evaporating solvent, the residual oil may be crystallized from a suitable solvent, e. g., alcohol, to yield the desired thioester, usually a stable solid.

The quantity of acid-binding agent necessary for accomplishment of the objectives of the present invention may be varied over a considerable range. It is only necessary that sufficient acid-binding agent be present to render the reaction mixture slightly basic, while the upper limit is usually, though not always necessarily, a pH of about 10. The basicity is critical to the extent that it should be less than that which causes hydrolysis of the thioester linkage.

The following examples are given to illustrate the practice of the present invention, but are in no way to be construed as limiting.

*Example 1.—Ethyl 3-beta-hydroxy-(delta 5)-thiocholenate*

The acid chloride prepared from 30.0 grams (0.075 mole) of 3-beta-formoxy-(delta 5)-cholenic acid was dissolved in 200 milliliters of benzene and treated with 37 milliliters (0.50 mole) of ethyl mercaptan and 10 milliliters of pyridine. After standing overnight at room temperature, the reaction mixture was diluted with 250 milliliters of water and extracted with 250 milliliters of ether in portions. The ether layer was washed with one per cent sodium hydroxide, one per cent hydrochloric acid, and water. After drying, the ether was distilled and the residue crystallized from 300 milliliters of alcohol and 50 milliliters of water, giving 23 grams (72 per cent) of ethyl 3-beta-hydroxy-(delta 5)-thiocholenate, M. P. 98–100 degrees centigrade. Several recrystallizations from hexane-benzene raised the melting point to 108.5–109.5 degrees centigrade.

*Example 2.—Methyl 3-hydroxy-11-formoxy-(delta 5)-nor-thiocholenate*

In the same manner as given for Example 1, this compound is prepared from 3, 11-diformoxy-(delta 5)-nor-cholenic acid chloride (prepared by formylation of 3, 11-dihydroxy-(delta 5)-cholenic acid and treatment of the product with thionyl chloride) and methyl mercaptan in the presence of pyridine.

It is to be understood that the invention is not limited to the exact details of operation or compounds shown and described, as obvious modifications and substitution of equivalents may be made in the invention without departing from the spirit or scope thereof, which will be apparent to one skilled in the art, and we therefore limit ourselves only as defined in the appended claims.

We claim:
1. The process which includes: thioesterifying an unsaturated derivative of the pregnane series, containing a C 5-6 double bond and a C-20 side-chain of the formula: —$(CH_2)_n$—COX, wherein X is selected from hydroxyl and halogen, and $n$ is selected from zero, one, and two; while simultaneously deformylating a formoxy group at the C-3 carbon atom of the pregane nucleus to a hydroxyl group by reacting the pregnane derivative with a mercaptan in the presence of an acid-binding agent.

2. The process which includes: thioesterifying an unsaturated pregnane derivative, containing a C 5-6 double bond and a C-20 side-chain of the formula: —$(CH_2)_n$—COX, wherein X is a halogen atom, and $n$ is selected from zero, one, and two; while simultaneously deformylating a formoxy group at the C-3 carbon atom of the pregnane nucleus to a hydroxyl group by reacting the pregnane derivative with a mercaptan in the presence of an acid-binding agent.

3. The process of claim 2, wherein the starting compound is a pregnene derivative.

4. The process of claim 2, wherein the simultaneous thioesterification and deformylation is accomplished at a pH below about 10.

5. The process of claim 2, wherein the simultaneous thioesterification and deformylation is accomplished with a mercaptan and pyridine.

6. The process of claim 2, wherein the pregnane derivative is 3-formoxy-(delta 5)-cholenic acid chloride.

7. The process of claim 2, wherein the starting compound is a pregnadiene derivative.

8. The process which includes: thioesterifying a pregnene derivative, having a C-20 side-chain of the formula: —$(CH_2)_n$—COX, wherein X is a halogen atom and $n$ is selected from zero, one, and two, said pregnene derivative containing an acyloxy group in the nucleus other than at the C-3 position, while simultaneously deformylating a formoxy group at the C-3 position of the pregnene nucleus to a hydroxy group, to give a 3-hydroxy-acyloxy-pregnene thioester by reacting the pregnene derivative with a mercaptan in the presence of an acid-binding agent.

9. The process of claim 8, wherein the simultaneous thioesterification and deformylation is accomplished at a pH below about 10.

10. The process of claim 6, wherein the simultaneous thioesterification and deformylation is accomplished with a mercaptan and pyridine.

11. The process of claim 8, wherein the pregnene derivative is 3,11-diformoxy-(delta 5)-norcholenic acid chloride.

12. Ethyl 3-hydroxy-(delta 5)-thiochlorenate.

ROBERT H. LEVIN.
A. VERN McINTOSH, Jr.
GEORGE B. SPERO.

REFERENCES CITED

The following references are of record in the file of this patent:

UNITED STATES PATENTS

| Number | Name | Date |
|---|---|---|
| 2,180,095 | Strassberger | Nov. 14, 1939 |

OTHER REFERENCES

Jones, Jour. Chem. Soc., 95, 1904–1909 (1909).
Chakrovarti, Chem. Abst. 21, page 3192 (1927).
Arndt, Berichte 63B, pages 2390–2393 (1930).

Certificate of Correction

Patent No. 2,566,341 September 4, 1951

ROBERT H. LEVIN ET AL.

It is hereby certified that error appears in the printed specification of the above numbered patent requiring correction as follows:

Column 1, line 9, for "is a zero" read *is zero*; column 2, line 15, for "pregnane" read *pregnene*; column 3, line 37, for "acqueous" read *aqueous*; column 4, line 72, for the claim reference numeral "6" read *8*; column 5, line 3, for "thiochlorenate" read *thiocholenate*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*